(12) United States Patent
Sesko

(10) Patent No.: US 7,317,513 B2
(45) Date of Patent: Jan. 8, 2008

(54) ABSOLUTE DISTANCE MEASURING DEVICE

(75) Inventor: David W. Sesko, Woodinville, WA (US)

(73) Assignee: Mitutoyo Corporation, Kawasaki (JP)

( * ) Notice: Subject to any disclaimer, the term of this patent is extended or adjusted under 35 U.S.C. 154(b) by 196 days.

(21) Appl. No.: 10/891,138

(22) Filed: Jul. 15, 2004

(65) Prior Publication Data

US 2006/0012772 A1   Jan. 19, 2006

(51) Int. Cl.
*G01C 3/08* (2006.01)
(52) U.S. Cl. .................. 356/4.09; 356/4.1; 356/4.01
(58) Field of Classification Search .............. 356/4.09
See application file for complete search history.

(56) References Cited

U.S. PATENT DOCUMENTS

| | | | | |
|---|---|---|---|---|
| 3,970,389 | A * | 7/1976 | Mendrin et al. | 356/4.1 |
| 5,377,219 | A * | 12/1994 | Geiger | 372/97 |
| 5,790,242 | A * | 8/1998 | Stern et al. | 356/4.04 |

FOREIGN PATENT DOCUMENTS

| EP | A 0997748 | 5/2000 |
|---|---|---|
| GB | A 2328739 | 3/1999 |

OTHER PUBLICATIONS

Franco Quercioli et al.; "Optical Surface Profile Transducer"; Optical Engioneering; Feb. 1988; vol. 27, No. 2, pp. 135-142.

Sarah L. Dobson et al.; "Diffractive lenses for Chromatic Confocal Imaging"; Applied Optics; Jul. 10, 1997; vol. 36, No. 20, pp. 4744-4748.

Zorabedian, Paul et al., "Bistability in Grating-Tuned External-Cavity Semiconductor Lasers," *IEEE Journal of Quantum Electronics*, vol. QE-23, No. 11, Nov. 1987, pp. 1855-1860.

Dobson, Sarah et al., "Diffractive lenses for chromatic confocal imaging," *Applied Optics*, vol. 36, No. 20, Jul. 10, 1997, pp. 4744-4748.

Braun, David et al., "Broadband multilayer antireflection coating for semiconductor laser facets," *Optics Letters*, vol. 20, No. 10, May 15, 1995, pp. 1154-1156.

* cited by examiner

*Primary Examiner*—Thomas H. Tarcza
*Assistant Examiner*—Luke D. Ratcliffe
(74) *Attorney, Agent, or Firm*—Oliff & Berridge, PLC

(57) ABSTRACT

An external cavity laser has an external cavity that is formed between a target surface and a laser diode facet located farthest from the target surface. A chromatic dispersive element is disposed in the external cavity, and focuses light from the laser diode such that one wavelength is focused at a focal spot on the target surface. Light reflected from the focal spot on the target surface is the predominant wavelength coupled back into the laser waveguide, which provides a feedback signal that determines the oscillation wavelength of the laser diode. The laser diode therefore outputs a well-defined wavelength of light which corresponds to the distance between the chromatic dispersive element and the target surface.

23 Claims, 10 Drawing Sheets

ABSOLUTE DISTANCE MEASURING DEVICE

BACKGROUND OF THE INVENTION

1. Field of Invention

This invention is directed to absolute distance measuring devices. In particular, this invention is directed to an absolute distance measuring device that uses wavelength-dependent external cavity feedback control of a laser diode.

2. Description of Related Art

Tunable external cavity diode lasers (ECDLs) are widely used in light-based test and measurement equipment and are increasingly used in wavelength division multiplexed (WDM) optical voice and data communications devices. The tuning is accomplished by a combination of filtering the wavelength and varying the optical path length between the two end reflectors that define the extent of the external cavity. The external cavity is formed by an external feedback reflector and the facet of the laser chip that is distal with respect to the external reflector.

Diode lasers have also been used as interferometers by allowing light reflected and backscattered by a measurement target surface to re-enter the laser diode such that the wavelength and amplitude of the laser diode output is modulated as the distance to the measurement target surface is varied. In this situation, the laser is operated in a self-mixing regime, wherein the feedback from reflections off the external measurement target surface interferes with the operation of the laser diode facet reflections that ordinarily occur within the solitary laser diode. This is frequently referred to as self-mixing. The resulting signal becomes amplified by the laser medium and provides a signal that varies periodically with changes in the length of the external cavity.

Absolute distance measurement systems have been made based on the self-mixing principle, by either applying a modulation to the laser diode wavelength or by applying a modulation to the distance from the laser diode to the external measurement target surface, and analyzing the relationship between the self-mixing signal and the applied modulation to determine the absolute distance measurement.

SUMMARY OF THE DISCLOSURE

Absolute distance measurement systems based on the self-mixing principle may modulate the wavelength of a laser diode output by, for example, a triangular function. Light back-scattered from a target surface causes strong variations in the laser output power, as a function of the modulated laser wavelength, via the self-mixing interference effect between the internally reflected light and the externally reflected light. By measuring the occurrence of interference peaks in the laser output signal, as a function of the laser wavelength variation, the distance to a target can be inferred.

Alternatively, an absolute measurement may be obtained by dithering the distance to the target by mounting the laser diode or the target on, for example, a piezoelectric actuator or loudspeaker. Again, by measuring the occurrence of interference peaks in the laser output power, as a function of the changing distance to the target and the known wavelength, the absolute distance to the target can be inferred.

However, either the distance to the target or the laser wavelength must be modulated in order to obtain an absolute distance measurement. The additional components required to modulate the distance to the target or the laser wavelength increase the cost and complexity of the absolute distance measuring device based on the laser diode self-mixing effect. In addition, the accuracy of these self-mixing type range finders is degraded by shifts in the nominal wavelength of the laser, which may be introduced by changes in the ambient temperature, self-heating, or the like. Temperature shifts may also lead to mode hops, which also degrade the measurement precision.

Here, systems and methods are described for determining an absolute distance to a measurement target surface, using a resonant external cavity laser with a chromatic dispersive focusing element. The chromatic dispersive focusing element focuses light at a focal point whose distance from the chromatic dispersive focusing element depends on the wavelength of the light. The chromatic dispersive element is disposed within the resonant external cavity, between a semiconductor laser gain medium and a target surface. One end of the resonant external cavity is formed by the target surface, and the other end is formed by the distal facet of the semiconductor gain medium. Using a chromatic dispersive focusing element to focus light which may have components at multiple wavelengths, only one wavelength component of the light is focused exactly at the target surface. This wavelength of light that is focused at the target surface, is the wavelength which is coupled or reflected most efficiently as a feedback signal into the waveguide of the laser gain medium. Therefore, the feedback signal predominantly contains light of the wavelength that was correctly focused by the chromatic dispersive element on the target surface. This feedback signal strongly influences or controls the output wavelength of the laser gain medium, by lowering the gain threshold of the laser at the predominant wavelength of the self-injected light. Through stimulated emission processes, the high gain and strong mode competition within gain medium cause the wavelength of the output of the laser to correspond to the absolute distance between the chromatic dispersive element and the target surface, thereby providing a measure of the absolute distance between the target surface and the chromatic dispersive element.

The laser diode facet that is nearest to the target surface is interchangeably called the proximal facet or the intracavity facet herein. The semiconductor laser gain medium may have an anti-reflection (AR) coating on its proximal facet that is optically coupled to the resonant external cavity. This suppresses or substantially eliminates proximal facet feedback within the solitary laser cavity, which might otherwise compete with the desired external cavity feedback and lead to spectral mode instability. The laser diode facet that is farthest from the target surface is interchangeably called the distal facet or the rear facet herein. A partially transmissive reflective coating may be provided on a distal facet of the laser gain medium, to emit or leak sufficient radiation from the resonant cavity that the radiation wavelength may be measured by a detector, to determine the absolute distance to the target.

The external cavity laser may include an etalon which selects a single longitudinal mode from the potentially multiple modes which may exist in the external cavity. When the Gaussian depth of focus is sufficiently long, more than one longitudinal mode may come to a sufficient focus within the Gaussian depth of focus. The etalon is designed to select a single one of these longitudinal optical modes for amplification by the laser gain medium.

The etalon may be disposed in a non-perpendicular arrangement relative to an optical axis of the laser gain medium. In this manner, spurious reflections are directed away from the optical axis of the gain medium to avoid the associated disturbance of the laser operation.

BRIEF DESCRIPTION OF THE DRAWINGS

Various exemplary embodiments are described in detail, with reference to the following figures, wherein.

DETAILED DESCRIPTION OF EXEMPLARY EMBODIMENTS

Figure 1:
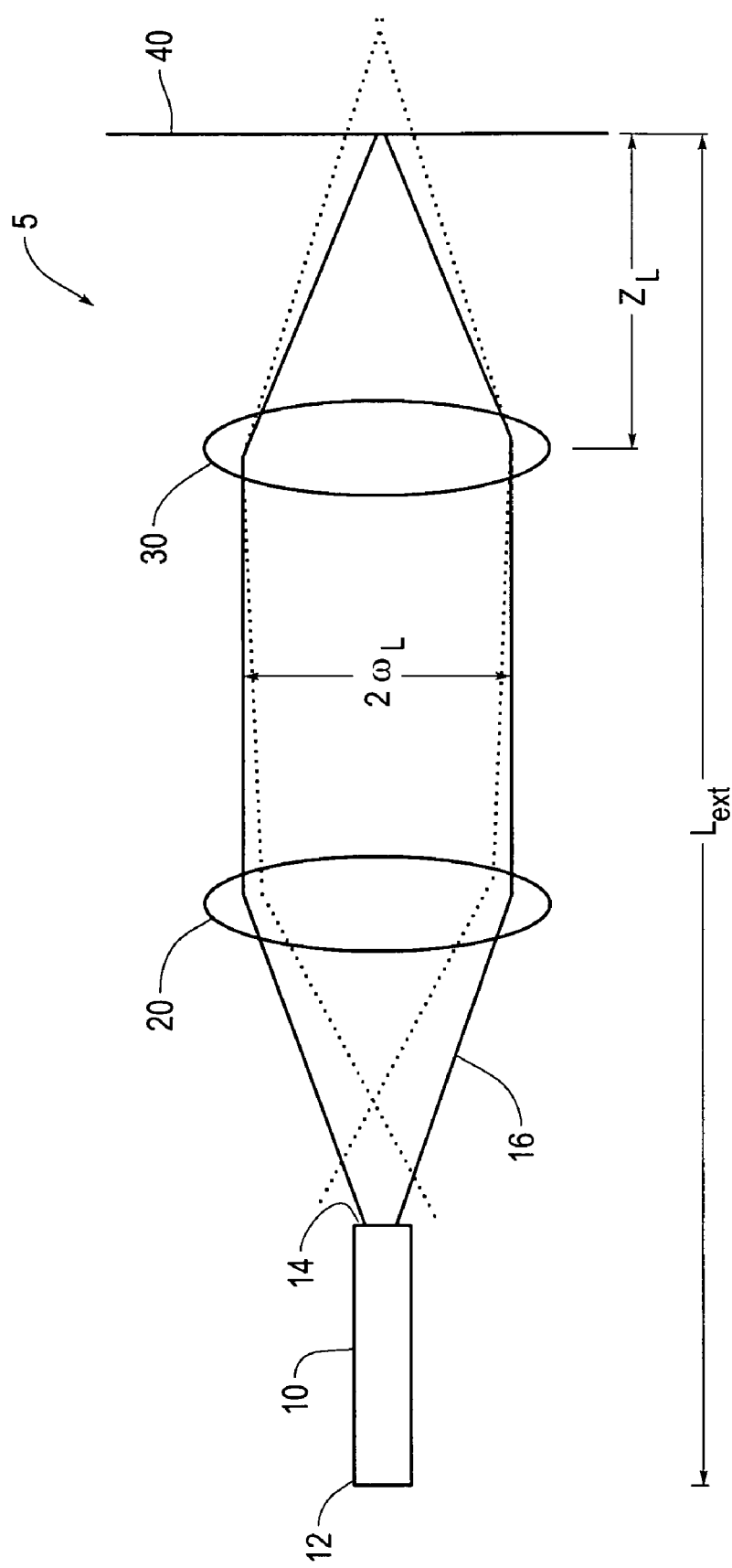
FIG. 1 illustrates the wavelength determining portion of an absolute distance measuring device, using an external cavity with a chromatic dispersive element.

FIG. 1 illustrates the wavelength determining portion of a first exemplary embodiment of a self-injection laser diode absolute distance measuring device (measuring device) 5, that includes a laser gain medium 10. The laser gain medium 10 has an extent defined by a distal end facet 12 and a proximal intracavity facet 14. The laser gain medium 10 emits radiation in a divergent beam pattern. The divergent beam pattern is collimated by a collimating lens 20 into substantially parallel rays, which are then focused to a point on a target surface 40 by a chromatic dispersive focusing element 30. The chromatic dispersive focusing element has the property that light of different wavelengths is focused at different focal planes, whose position depends on the wavelength of the light. The target surface is located at the correct focal depth for at least one wavelength within the gain bandwidth of the laser diode.

The laser gain medium 10 defines a cone of admittance 16 determined by the laser's waveguide structure, within which light reflected from the target surface 40 re-enters or couples to the laser gain medium 10 via the proximal facet. Reflected (back-scattered) light from the focal spot on the target surface 40 enters the cone of admittance 16. When the reflected light coupling is of great enough intensity that the gain threshold of the laser is substantially lowered, the gain medium 10 amplifies the reflected or back-scattered light through stimulated emission. As previously mentioned, an AR coating on a surface of the intracavity facet 14 suppresses or substantially eliminates internal reflection feedback within the solitary laser cavity. Thus, the wavelength of the output of the laser diode depends on the wavelength that is most efficiently reflected and coupled from the external cavity, which is the wavelength that is focused at the plane of target surface 40. Thus, the wavelength of the output of the laser diode corresponds to the absolute distance between the chromatic dispersive focusing element 30 and the target surface 40.

The measuring device 5, shown in FIG. 1, has its elements arranged on an optical axis defined by the axis of the laser gain medium 10 and chromatic dispersive focusing element 30. The external cavity of length $L_{ext}$ is formed by the distal facet 12 of the laser gain medium 10, and the target surface 40. The cavity can therefore support longitudinal modes $\Delta\lambda$ spaced according to $\Delta\lambda=\lambda^2/2L_{ext}$. For a cavity having an optical path length of about 10 millimeters (mm), and a wavelength of about 1550 nm, the spacing between the longitudinal modes is about 0.12 nm. The mode with the lowest gain threshold (least loss) will predominantly control the laser wavelength due to strong mode competition in the gain medium.

The measuring device 5 may use a laser gain medium 10 of any convenient type, such as a (Al,Ga)InP, AlGaAs, or InGaAs multiple quantum well or quantum dot heterostructure, for example. The laser gain medium 10 may be a Fabry-Perot type, edge-emitting or VCSEL single spatial mode semiconductor amplifier, emitting in the wavelength region 600-1500 nm, for example. Zia Laser, Incorporated, of Albuquerque, N.Mex., manufactures an InGaAs quantum dot external cavity laser diode with a gain bandwidth centered at 1200 nm and exhibiting a gain curve over 200 nm wide. These parameters are suitable for various applications of this device, although this device is not so limited. Various other nominal wavelengths and gain curve widths are usable in various applications. It should be appreciated that the wavelength detection resolution in combination with the optical system design, including the chromatic dispersive characteristics of the chromatic dispersive focusing element 30, will generally determine the measurement resolution of the device and the width of the laser gain curve will determine the absolute measurement range of the device.

The waveguide structure of diode lasers typically gives rise to a highly divergent output beam, with divergence angles anywhere from about 10 degrees to about 40 degrees. Moreover, the output beam may be non-circular or elliptical, having one angle of divergence along one axis and another angle of divergence along the other. Focusing such an elliptical beam will result in astigmatism, wherein the elliptical beam will come to a focus at two different depths, leading to a depth uncertainty of several microns (μm). An aspherical lens, weakly cylindrical lens or an anamorphic prism pair disposed between the laser gain medium 10 and the collimating lens 20, or any other suitable now-known or later-developed method, may be used to reduce such beam astigmatic effects to a desired level.

The chromatic dispersive focusing element 30 can be any optical element which focuses light in a focal plane located at a distance which depends on the wavelength of the light. Chromatic dispersive refractive lens elements and diffractive optical elements are examples of such chromatic dispersive focusing elements wherein the distance between the chromatic dispersive focusing element 30 and the focal point is a function of the wavelength of radiation. This relationship is characterized by a dispersion constant $K_L$, which is equal to the change in focal length divided by the change in wavelength for the chromatic dispersive focusing element 30. $K_L$ may be on the order of 5-10 μm/nm, for example, although this device is not limited to any particular range of dispersion constant values. Furthermore, when a refractive lens provides the chromatic dispersive focusing element 30, $K_L$ may be positive, and when a diffractive optical element provides the chromatic dispersive focusing element 30, $K_L$ may be negative.

Figure 2:
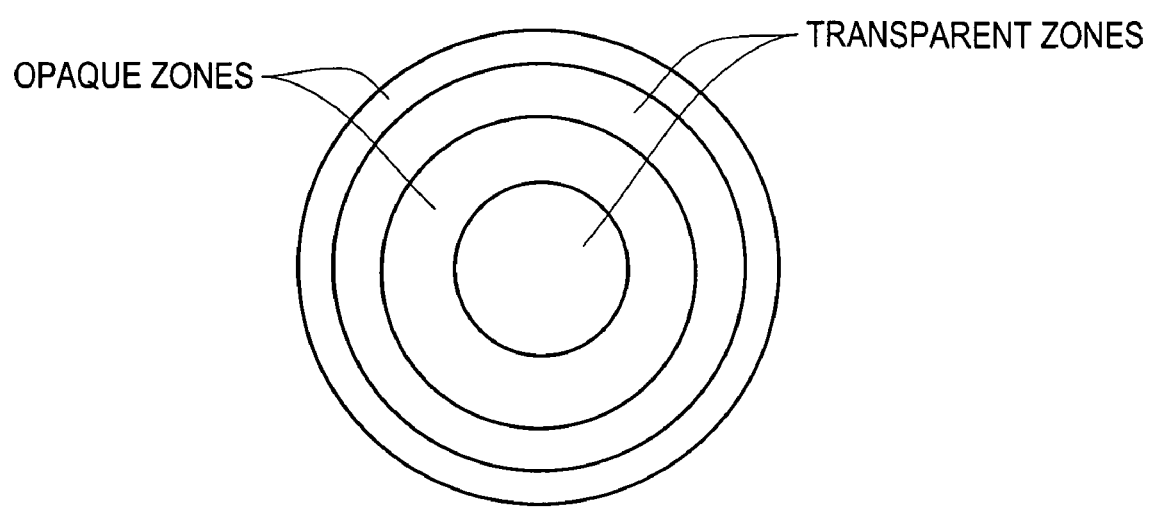
FIG. 2 illustrates an exemplary chromatic dispersive element, in the form of a Fresnel zone plate.

Diffractive optical elements are chromatic dispersive elements which achieve the focus by having rays of respective wavelengths constructively interfere at certain respective points along an optical axis. One well known example of such a diffractive optical element is a Fresnel zone plate. A Fresnel zone plate is a radially symmetric optical element, having regions which are optically opaque, alternating with regions which are optically transmissive. An exemplary schematic of the central rings of a typical Fresnel zone plate is shown in FIG. 2.

Figure 3:
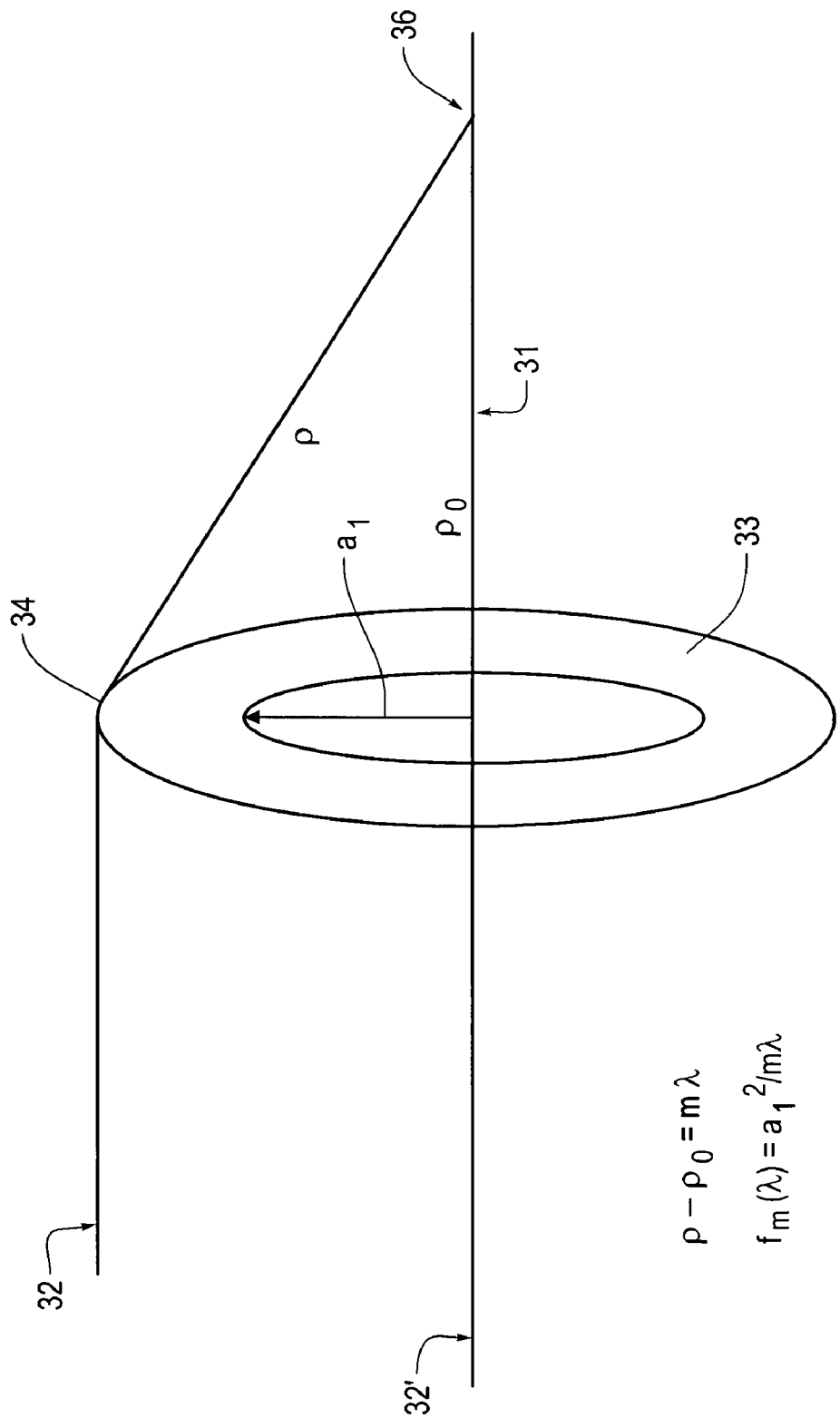
FIG. 3 illustrates parameters relating to the Fresnel zone plate of FIG. 2.

The radial dimensions of the optically transmissive and optically opaque zones of a Fresnel zone plate are determined by geometric and trigonometric factors such that the light transmitted through the zone plate constructively interferes at a point on an optical axis 31 of the Fresnel zone plate. In FIG. 3, which shows the transmissive central zone and the optically opaque surrounding zone of a typical Fresnel zone plate, a light ray 32 of a plane wave is diffracted at a point 34 at the outer edge of an opaque ring 33 of the Fresnel zone plate and travels a distance $\rho$ to a point 36 on the optical axis 31. Another ray of the plane wave travels along the optical axis 31 to the Fresnel zone plate, and travels a distance $\rho_0$ from the plane of the Fresnel zone plate to the same point 36. The rays traveling on the two different paths constructively interfere if a phase difference between them is an integral number of wavelengths of the light emitted from point source 32. Mathematically, this condition can be expressed as:

$$\rho - \rho_0 = m\lambda \qquad (1)$$

where m=1, 2 . . . is an integer.

For a central aperture of radius $a_1$, the radius of each successive "nth" circular boundary between the light and dark regions is given by $r_n = n^{1/2} a_1$. In general, the larger the number of rings in a Fresnel zone plate, the higher the light intensity at the focal spot and the smaller the depth of field. Thus, a Fresnel zone plate comprising several rings is generally desirable in many applications and a desirable number of rings may be determined and/or confirmed by simulation or experiment. The rays from such a Fresnel zone plate 33 can be shown to come to a focus at a focal point $f_n(\lambda)$, which is given by $$f_m(\lambda) = a_1^2/(m\lambda) \qquad (2)$$

Thus, the focal distance for the Fresnel zone plate 33 depends on the radiation wavelength $\lambda$. Accordingly, a suitable Fresnel zone plate is one type of element that may be used as the chromatic dispersive element 30.

A zone plate usable as a chromatic dispersive element in the self-injection laser diode absolute distance measuring device 5 can be made by any suitable now-known or later-developed method. One economical type of diffractive zone plate is made by conventional thin-film-chrome-on-glass techniques, or the like. Another diffractive zone plate, usable as a chromatic dispersive element in the self-injection laser diode absolute distance measuring device 5, is described in "Diffractive lenses for chromatic confocal imaging," by Dobson et al., Applied Optics, Vol. 36, No. 20, 10 Jul. 1997, pp. 4744-4748, which is incorporated herein by reference in its entirety. In this reference, the diffractive zone plate was a four phase level diffractive lens, patterned from a quartz wafer using e-beam lithography and subsequently chemically etched in a hydrofluoric acid bath.

Other types of diffractive optical elements are also known, such as multi-element lenses, in which layers of materials having different optical properties are laminated together. Custom designed and fabricated diffractive optical lenses and/or lens arrays are available from various sources, for example, Digital Optics Corporation, 9815 David Taylor Drive, Charlotte, N.C., USA. Diffractive optical lens design techniques are also described in *MICRO-OPTICS: Elements, Systems and Applications,* edited by Hans Peter Herzig, Taylor & Francis, London, 1970, and *Methods for Computer Design of Diffractive Optical Elements,* edited by Victor A. Soifer, John Wiley and Sons, Inc., New York, 2002.

Figure 4:
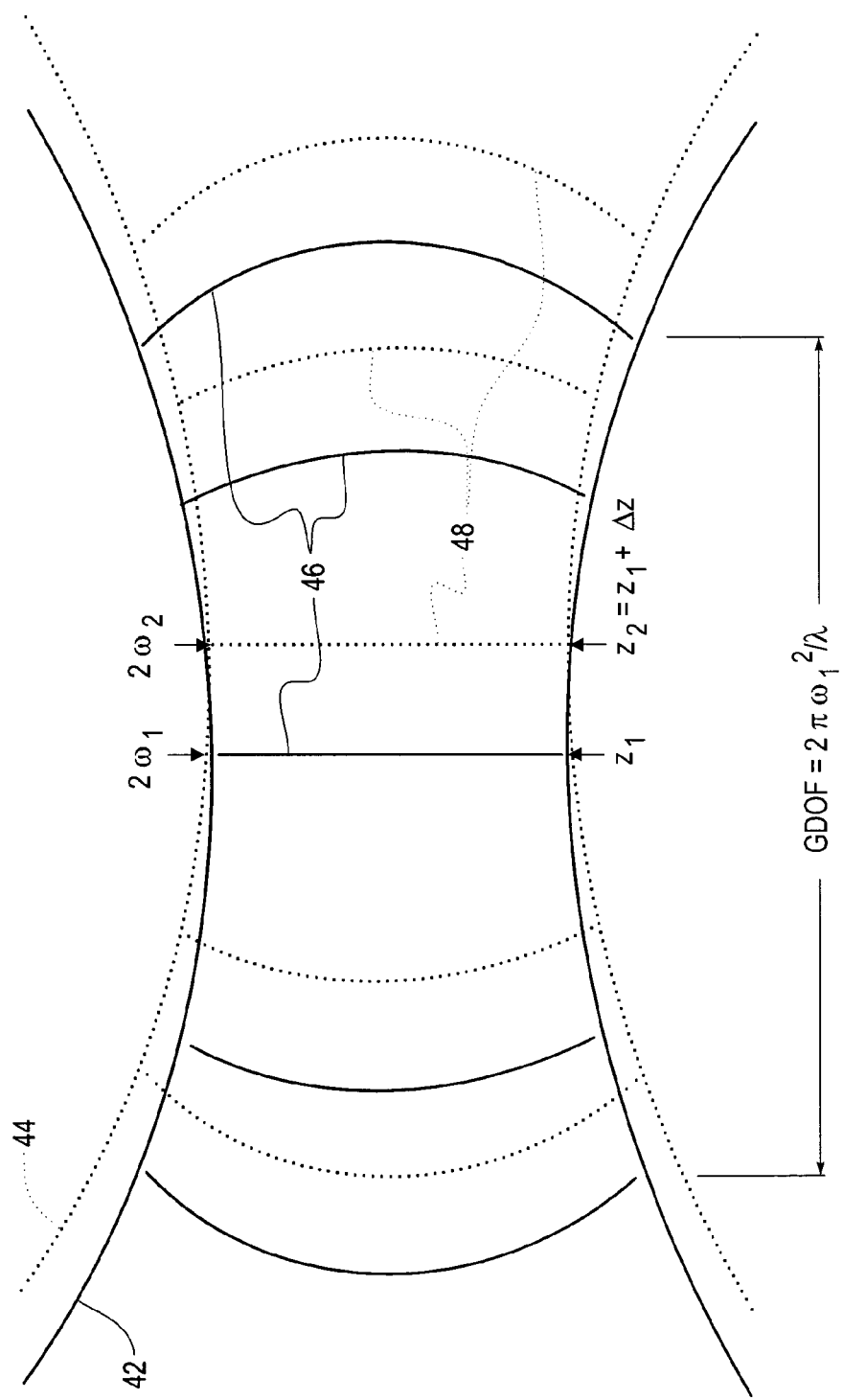
FIG. 4 illustrates the beam waist of a Gaussian beam focused by a chromatic dispersive element, and the Gaussian depth of focus.

The focal spot created by the chromatic dispersive focusing element 30 can be characterized by a Gaussian depth of focus (GDOF), which is defined as the distance over which the phase of the coherent wavefronts do not differ by more than a quarter of the wavelength of the radiation. The Gaussian depth of focus is illustrated in FIG. 4. FIG. 4 illustrates a light beam coming to a focus as a result of transmission through a chromatic dispersive focusing element 30 such as the Fresnel zone plate 33 shown in FIGS. 2 and 3. For clarity, the focus region is highly magnified and the chromatic dispersive focusing element 30 is not shown in FIG. 4. The beam illustrated in FIG. 4 has two wavelength components, $\lambda_1$ and $\lambda_2$. The envelope 42 of the first wavelength component $\lambda_1$ is best focused at a distance $z_1$ from the chromatic dispersive focusing element 30. The width of the beam within the center of Gaussian depth of focus is characterized by a beam waist or spot size $\omega_1$ which is related to the wavelength $\lambda_1$ and the Gaussian depth of focus according to:

$$GDOF = 2\pi\omega_1^2/\lambda_1 = \frac{2\lambda_1}{\pi}\left(\frac{z_1(\lambda_1)}{\omega_L(z_1(\lambda_1))}\right)^2 \approx \frac{\lambda_1}{NA} \qquad (3)$$

where $\omega_L$ is the beam radius at the chromatic dispersive focusing element 30 (as shown in FIG. 1), and NA is the numerical aperture of the chromatic dispersive focusing element 30, defined as the aperture diameter divided by the focal distance. The minimum focal point $\omega_1$ occurs at a distance $z_1$ from the chromatic dispersive focusing element 30, where the surface of constant phase 46 is vertical (planar) in FIG. 4.

The envelope 44 of the second wavelength component of the beam is shown by the dashed lines in FIG. 4. The second wavelength component, having a wavelength $\lambda_2$ is best focused at a distance of $z_2 = z_1 + \Delta z$ from the chromatic dispersive focusing element 30, and a distance $\Delta_z$ from the best focus of the first wavelength $\lambda_1$. The distance $\Delta_z$ between the best focus spots depends on the wavelengths $\lambda_1$ and $\lambda_2$ of the beam components according to equation (2) above, and on the dispersion constant of the chromatic dispersive focusing element 30.

Because the chromatic dispersive focusing element 30 focuses rays of different wavelengths at different focal planes, a nominal Gaussian depth of focus will include the best focal points for a spectrum of different wavelengths, such as $\lambda_1$ and $\lambda_2$ as shown schematically by the solid and dashed lines in FIG. 4. The depth of focus therefore contributes in a primary way to the depth resolution (measurement resolution) of the device. In particular, the depth of focus in combination with the dispersion constant $K_L$ can be related to a wavelength uncertainty, also known as a resolution bandwidth $\Delta\lambda_{CD}$, which nominally corresponds to the full-width half-maximum (FWHM) bandwidth of the light reflected back from the target surface 40 and coupled back into the laser waveguide gain medium 10. This relationship is simply:

$$\Delta\lambda_{CD} = GDOF/K_L \quad (4)$$

According to equation (4), the resolution bandwidth of the light reflected back from the target surface 40 and coupled back into the laser waveguide gain medium 10 is proportional to the Gaussian depth of focus and inversely proportional to the dispersion constant $K_L$. Therefore, to make the device have the highest resolution (smallest wavelength uncertainty) possible, the narrowest reflected bandwidth is desirable, which implies a large dispersion constant $K_L$, along with a small Gaussian depth of focus GDOF. Obtaining a smaller Gaussian depth of focus entails having a large numerical aperture NA, since the Gaussian depth of focus is related to the numerical aperture according to equation (3). In some multi-level diffractive optical elements (DOE's), the achievable numerical aperture is limited by shadowing effects, wherein the overhang of an opaque feature of the diffractive optical element that occurs later along an optical path shadows the path of a light ray deflected by a feature of the DOE that occurs earlier along an optical path, reducing the transmission of the element and blurring the focal spot. Larger numerical apertures can be achieved by using a refractive type chromatic dispersive focusing element 30, or by forming a "composite" chromatic dispersive focusing element 30 that comprises a chromatic dispersive diffractive optical element in combination with one or more conventional lenses to receive the beam or spot that is output from the chromatic dispersive diffractive optical element and remagnify it to provide a larger numerical aperture. One possible arrangement for such a "composite" chromatic dispersive focusing element that uses multiple lenses is described in the previously incorporated article by Dobson et al.

Table 1, below, summarizes one possible set of parameters which may be used in the design of a self-injection absolute distance measuring device.

TABLE 1

| Parameter | Value | Description |
| --- | --- | --- |
| $\Delta\lambda_{GAIN}$ | 100 nm | Laser gain bandwidth |
| $K_L$ | 10 microns/nm | Longitudinal chromatic dispersion coefficient |
| $L_{EXT}$ | 10 mm | External cavity length (Nominal) |
| $\lambda$ | 1550 nm | Laser wavelength (Nominal) |
| Range | 1 mm | Measurement range |
| $Z_L(\lambda)$ | 5 mm | Gaussian focal length |
| $\omega_L(z_L(\lambda))$ | 1 mm | Beam radius at chromatic dispersive focusing element |
| GDOF | 25 microns | Gaussian depth of focus |
| $\Delta\lambda_{CD}$ | 2.5 nm | Resolution Bandwidth |
| $\Delta\lambda_{EXT} = \lambda^2/2L_{EXT}$ | 0.12 nm | External cavity mode spacing |

A wavelength that comes to a focus at the target surface 40, is reflected by the target surface 40, and traverses back through the optical system, and through the intracavity facet 14 to the laser gain medium 10. The gain medium only receives light that falls within the cone of admittance 16 and that falls within the waveguide aperture of the gain medium. The waveguide structure thus acts as a spatial filter which tends to admit predominantly the best focused rays returning from the target surface. Outside the cone of admittance 16, the rays have an off-axis trajectory which is too severe to be admitted into the laser gain medium 10. The cone of admittance 16 is shown diagrammatically in FIG. 1.

The gain threshold of the external cavity laser is lowered at the wavelength distribution that is returned within the cone of admittance, so that laser oscillation occurs at the wavelength that is most efficiently coupled back into the gain medium 10. In this event, the light is amplified by the laser gain medium 10, causing the laser to emit coherent radiation at a predominant wavelength which corresponds to the wavelength which is best focused by the chromatic dispersive element 30 onto the target surface 40. The wavelength of this radiation can be measured by any convenient now known, or later developed, technique.

Figure 5:
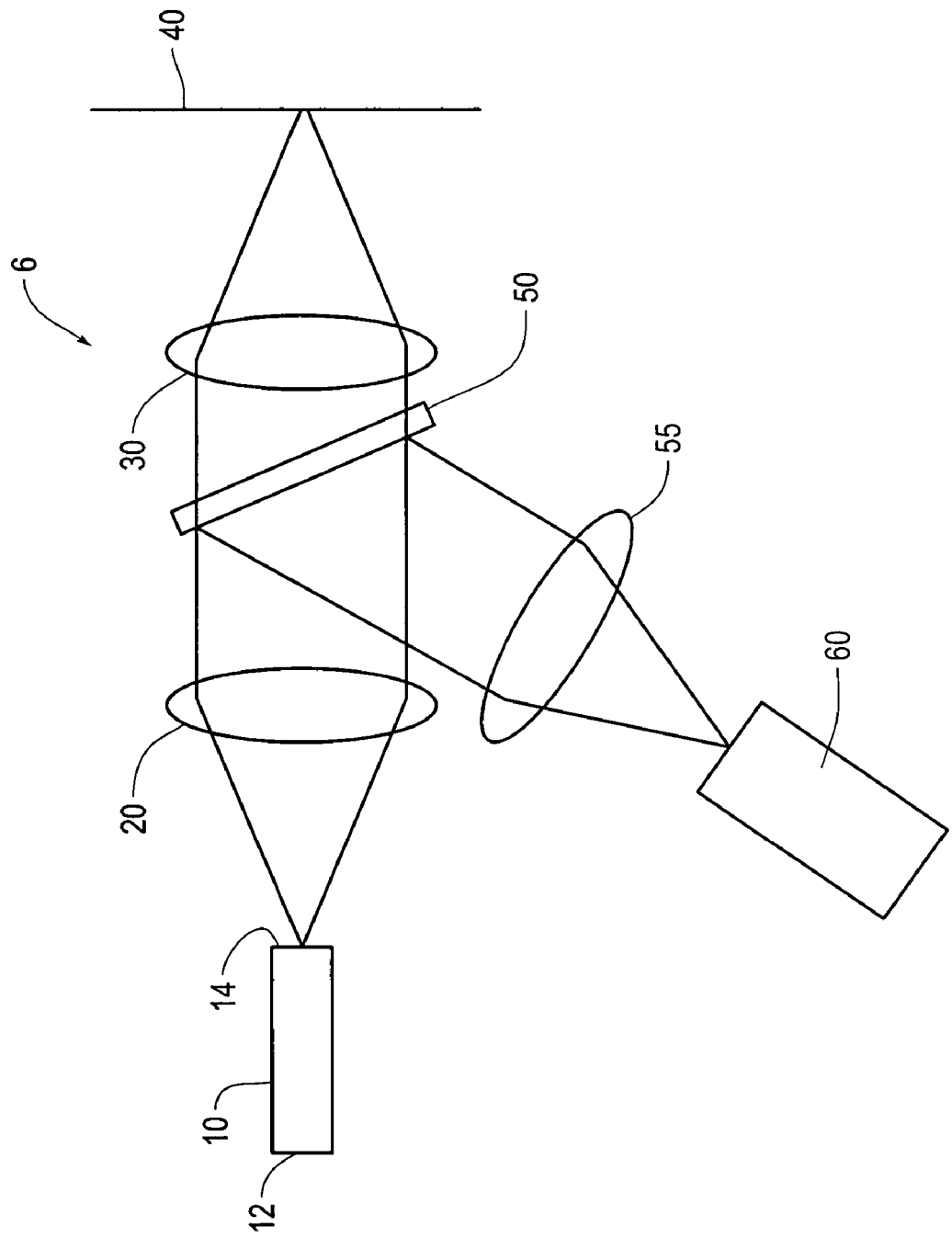
FIG. 5 is an exemplary schematic diagram of obtaining a measurement signal from a beamsplitter.

An exemplary wavelength measuring device 60 that measures the wavelength of the radiation emitted from the absolute distance measuring device 6 according to the previous description is shown in FIG. 5. The wavelength measuring device 60 receives light deflected from a beamsplitter 50 disposed within the external cavity of the absolute distance measuring device 6. The beamsplitter 50 directs the parallel rays to a focusing lens 55 (optional) which concentrates the rays to an input aperture of the wavelength measuring device 60. The wavelength measuring device 60 may be a wavemeter, a spectrometer, or a wavelength sensitive photodiode, for example. Suitable wavelength sensitive photodiodes are commercially available from Pacific Silicon Sensors, Inc., 5700 Corsa Ave., Westlake Village, Calif. The wavelength measuring device 60 then outputs a signal indicating the wavelength of the detected light, which in turn indicates the distance between the chromatic dispersive focusing element 30 and the target surface 40. However, the beamsplitter 50 reduces the optical power of the light fed back into the laser gain medium 10 from the external cavity, and therefore may degrade the potential signal to noise ratio and the resulting measurement performance of the absolute distance measuring device 6.

Figure 6:
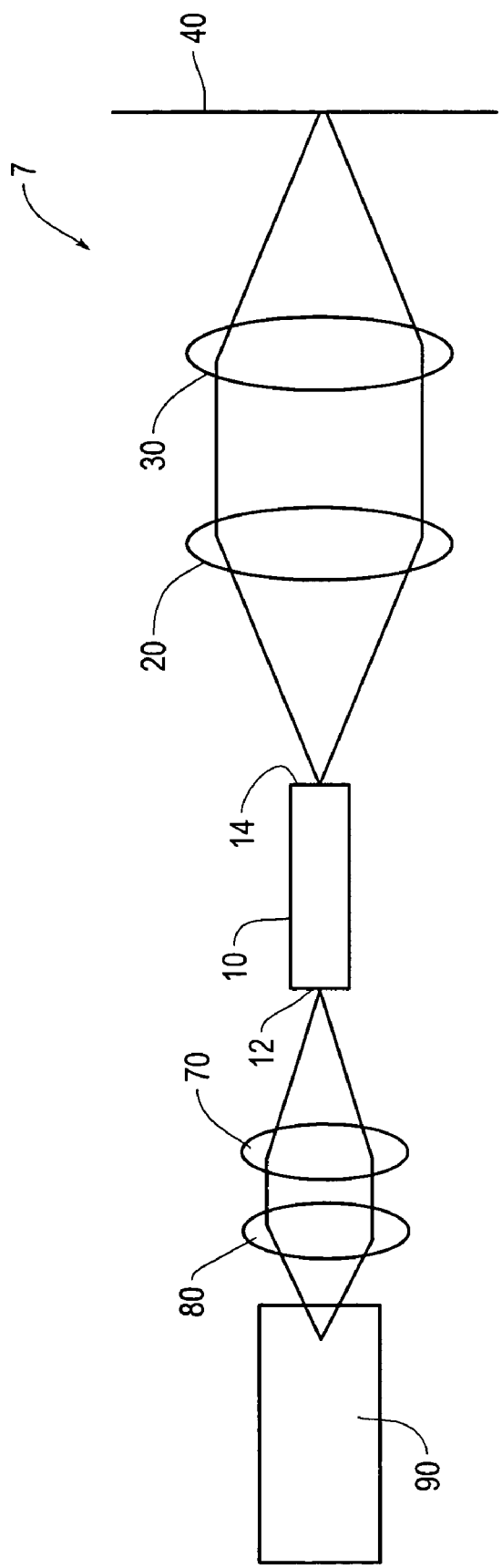
FIG. 6 is an exemplary schematic diagram of obtaining the measurement signal from the rear facet of the laser gain medium.

FIG. 6 shows a wavelength measuring device 90, disposed to receive light from the rear facet 12 of the laser gain medium 10. As before, the wavelength measuring device 90 may be a wavemeter, a spectrometer, or a wavelength sensitive photodiode, for example. The reflective coating on the rear facet 12 may be partially transmissive to emit a detectable amount of radiation. The divergent light (radiation) from the rear facet 12 may be collimated by a collimating lens 70 and focused into the input of a wavelength measuring means 90, by an input focusing lens 80. This configuration has the advantage of sampling the light emitted from the laser external cavity after traversing the gain medium, rather than extracting light from the external cavity before traversing the gain medium, so as not to reduce the optical power of the primary measurement signal light fed back into the laser gain medium from the wavelength determining external cavity.

Alternatively, any other now-known or later-developed wavelength measuring means that provides suitable accuracy for a given application may used. For example, a method for monitoring emission wavelength in widely tunable lasers that are monolithically integrated with semiconductor optical amplifiers (SOAs) is described in the article "Wavelength Monitoring in Widely Tunable Sampled-Grating DBR Lasers Integrated with Semiconductor Optical Amplifiers," by L. Majewski, J. Barton, L. A. Coldren, Y. Akulova, and G. Fish, Proc. CLEO/QELS 2002, paper no.

CWK4, Long Beach, Calif., (May 19-24, 2002) © Optical Society of America, which is incorporated herein by reference in its entirety. Although less accurate than previously disclosed methods of wavelength measurement, this method nevertheless provides a cost-performance tradeoff that is advantageous in some applications. Using an IC structure as described in the paper, the method makes use of the dependence of transparency current in the SOA portion of the IC on the laser emission wavelength of the laser portion of the IC. The transparency current is an approximately linear function of the laser wavelength, but can also be relatively precisely calibrated against a precision external wavelength detector using a higher order function or a lookup table that corresponds to a number of wavelengths that are precisely measured in calibration setup using a precision laboratory wavelength meter. Thereafter, in operation, the transparency current can be measured using various known precision current measuring circuits, also integrated on the IC if desired, and the wavelength can be decoded from the measured transparency current. To eliminate potential errors due to temperature effects, known laser diode temperature stabilization techniques may be used. Alternatively, a temperature sensing element may be used in conjunction with a calibration table that relates the temperature of the device to a temperature-dependent correction of the wavelength vs. transparency current relationship. When such means are used for wavelength monitoring, in contrast to previously disclosed configurations, no external wavemeter or related optical components are required, and reduced cost and device miniaturization are achieved. As mentioned above with respect to the operation of the measuring device 5, the chromatic dispersive element 30 may have a chromatic dispersion constant $K_L$ of a magnitude such that the device may support two or more longitudinal modes corresponding to wavelengths that come to a focus within a nominal Gaussian depth of focus. For example, using the parameters indicated in Table 1, the Gaussian depth of focus is 25 nm, so that according to equation (4), the resolution bandwidth is 2.5 nm, whereas the mode spacing is only 0.12 nm. Therefore, a plurality of longitudinal modes are potentially included in the resolution bandwidth. However, since the diode laser gain is very high, mode competition will strongly favor the mode with the lowest gain threshold, that is, the mode having the wavelength that is best focused at the target surface, and therefore has the least loss and/or greatest optical power coupled from the external cavity back into the laser gain medium 10. Ideally, the best focused wavelength will therefore predominantly or totally determine the laser oscillation wavelength, which in turn will indicate the corresponding focal distance, that is, the measurement distance to the target surface, with a high degree of resolution and accuracy. Generally, since the diode laser gain is very high, the linewidth of the resulting laser oscillation will be very much smaller than the resolution bandwidth, and smaller than the longitudinal mode spacing. In such cases, the measurement accuracy may primarily be limited by the wavelength detection method or other factors such as the target surface roughness, rather than factors inherent in the operation of the external cavity laser system.

In many cases, the wavelength detection method will include integrating a wavelength related signal over a period of time. In such cases the apparent detected laser wavelength may have a bandwidth that is broadened due to the integration of varying signals from variety of potential causes such as mode hopping, cavity length variations due to vibration and/or target surface variations, and the like. Regardless of the cause, in many cases the resulting "broad" wavelength detection signal(s) is(are) centered at the wavelength that is best focused at the most representative position of the target surface. By using a signal acquisition and analysis technique that in effect determines the center wavelength, or "centroid" or average of the detected laser wavelength power spectrum, the measurement resolution may still be determined at a level that is finer than the bandwidth of the apparent wavelength detection signal. For example, the measurement resolution may be achieved at a level approximately corresponding to the laser cavity mode spacing, for example corresponding to approximately 0.12 nm of wavelength change for the example set of design parameters discussed previously. This corresponds to an absolute distance measuring device resolution of approximately 1.2 μm when $K_L$=10 μm/nm.

Figure 7:
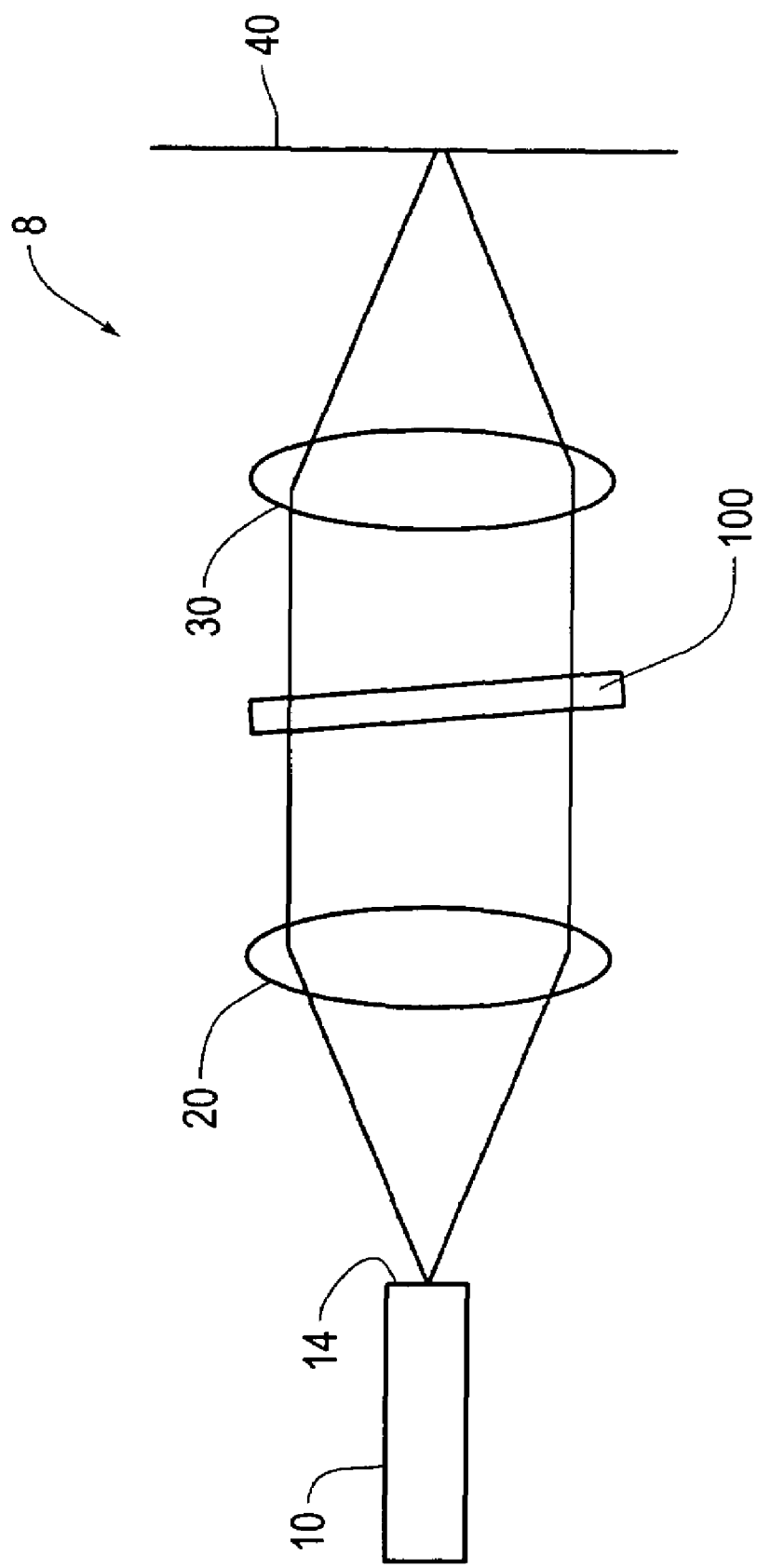
FIG. 7 is an exemplary schematic diagram of using an etalon to select a single longitudinal mode.

As an alternative to a laser measuring device which may support somewhat unpredictable mode hopping, an etalon may be inserted into the external cavity of the measuring device. The etalon passes only certain wavelengths, such that the device will only oscillate at a comb of discrete wavelengths, in order to reliably select only one of a plurality of potential modes falling within a resolution bandwidth $\Delta\lambda_{CD}$ that is centered at a wavelength that occurs within the measuring range of the device. FIG. 7 shows a measuring device 8 that incorporates an etalon 100 to suppress unwanted modes in a manner described below. The etalon 100 may be located in the external cavity between the collimating lens 20 and the chromatic dispersive element 30. The etalon 100 may be disposed to provide a slight angle of incidence, to avoid reflecting light back into the laser cavity, which would disrupt the desired operation of the laser gain medium 10 of the measuring device 8.

Figure 8:
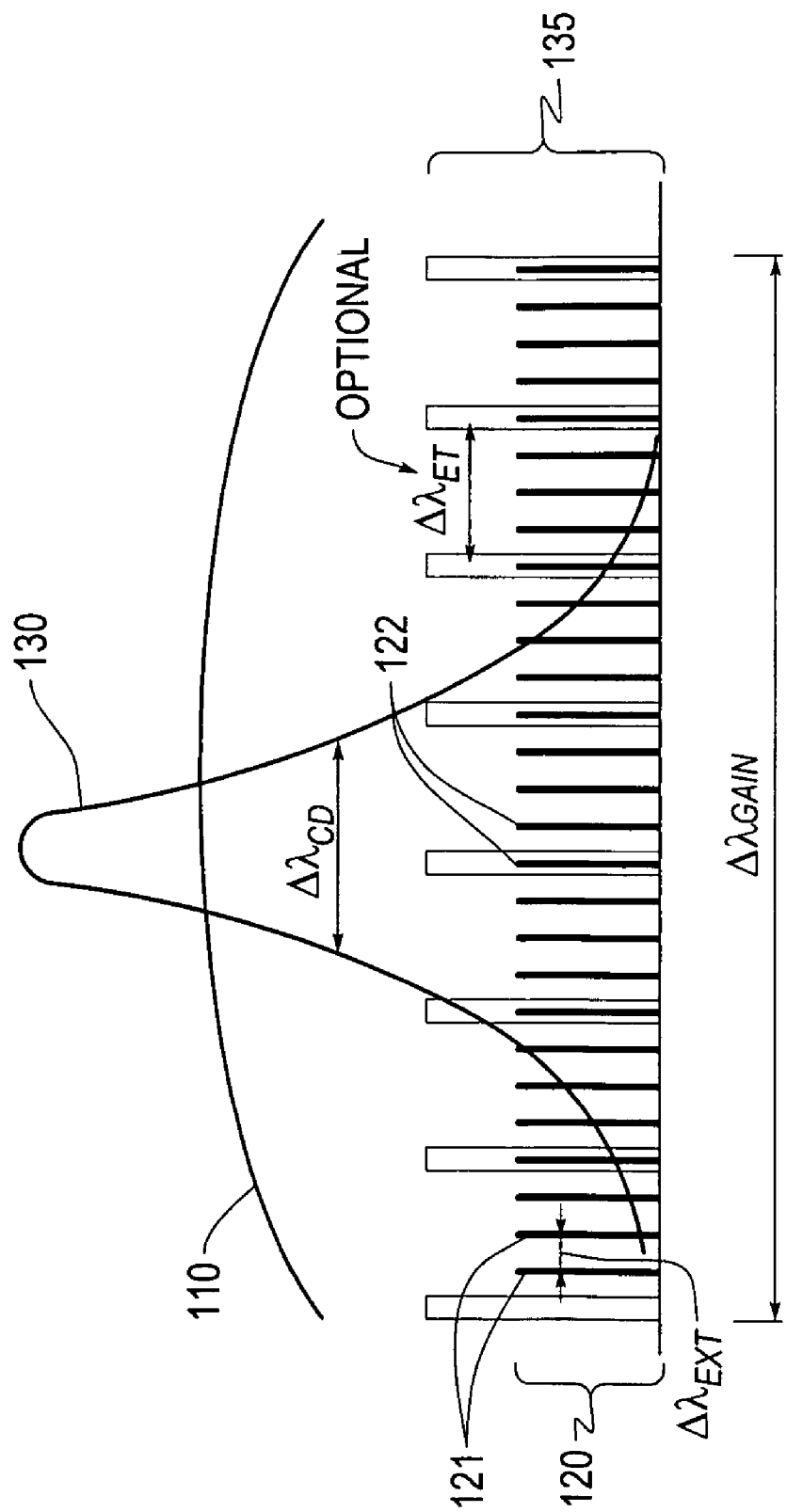
FIG. 8 is an exemplary schematic diagram comparing the spectrum of reflected light with the finesse of the etalon.

The operation of measuring devices 5-7, using the parameters listed in Table 1 for example, is illustrated qualitatively in FIG. 8. FIG. 8 shows the gain spectrum 110 of the laser gain medium 10, superimposed above a spectrum of the supported longitudinal cavity mode wavelengths 120 of the external cavity laser. Reference numerals 121 indicate two adjacent longitudinal modes. It should be appreciated the supported longitudinal cavity mode wavelengths 120 are idealized for the purposes of discussion. In general, due to surface roughness and/or vibrations that introduce some variability into the operational external length, additional supported wavelengths will typically be present in an actual device. Reference numeral 130 indicates the optical feedback spectrum that is coupled back into the laser gain medium, according to previously described operating principles. The optical feedback spectrum 130 has a resolution bandwidth $\Delta\lambda_{CD}$, determined by the dispersion constant $K_L$ and Gaussian depth of focus according to equation (4), as previously described. A representative comb of discrete wavelengths 135 that are passed by the etalon 100 are also shown in FIG. 8. For the example shown in FIG. 8, without an etalon, the approximately 6 or more potential longitudinal modes fall within the resolution bandwidth $\Delta\lambda CD$.

In situations where two external cavity modes have a similar feedback level, such as the pair of modes 122 shown in FIG. 8, multimode behavior may be observed. However, an intracavity etalon 100 may be used to suppress multimode behavior if needed or desired. This effectively reduces or eliminates unpredictable multimode behavior by only allowing laser oscillation at a wavelength in the comb of discrete wavelengths 135. Inserting an etalon of finesse f and free spectral range (FSR) improves the selectivity of the feedback light signal. In order to select a single longitudinal mode, the free spectral range and finesse f of the etalon should be chosen such that:

$$\frac{FSR}{f} \leq 2 \cdot \Delta\lambda_{EXT} \qquad (5)$$

wherein the free spectral range is given by:

$$FSR = \frac{\lambda^2}{2nt} \geq \frac{1}{2}\Delta\lambda_{CD} \qquad (6)$$

where t is the effective thickness along the direction of the light rays and n is the refractive index of the etalon. The etalon thickness t is chosen so that its free spectral range is greater than half the resolution bandwidth $\Delta\lambda_{CD}$ of the optical feedback spectrum 130, as expressed in equation (6). This corresponds to an optical thickness of less than about 1 mm, for the parameters listed in Table 1. The etalon may be tilted at an angle of 1-2 degrees with respect to the laser beam so that reflections off its surface will not be coupled back into the laser gain medium 10. The etalon spectral bandpass is designed to be wide enough to pass a wavelength supported within the optical feedback spectrum 130 and narrow enough to suppress other external cavity side modes within the optical feedback spectrum 130, as expressed by equation (5). The etalon finesse, f, is given by the free spectral range of the etalon, divided by the desired transmission linewidth of the etalon. The condition that the adjacent external cavity modes are filtered sets a lower limit for the etalon finesse.

The factor of two in equation (5) refers to the double pass through the etalon 100. For the laser to operate with a single mode we have the condition that the passband width of the etalon 100 must be equal to or less than twice the external cavity mode spacing, or 0.24 nm for the example set of design parameters used here. With the FSR=1.25 nm as calculated from equation (6), we have that finesse must be at least f>5. Therefore, using the etalon 100, the laser may only oscillate on the mode having a wavelength that is transmitted by the etalon and closest to the peak of the optical feedback curve 130. It should be appreciated that when the etalon 100 is used, since only discrete wavelengths separated by the value $\Delta\lambda_{ET}$ (shown qualitatively in FIG. 8) are transmitted by the etalon, the distance measurement of the measurement device 8 will change from one discrete measurement value to another only when the distance to the target surface changes by an accumulated amount corresponding to a wavelength change of $\Delta\lambda_{ET}$, which, in general terms, is typically at least a few times the longitudinal cavity mode spacing. Thus, in general, the potential measurement resolution and accuracy of the measuring device 8 will be coarser than the potential resolution and accuracy provided by the measuring devices 5, 6, and 7. However, the measurement device 8 may provide more stable or predictable operation, along with resolution and accuracy that is adequate for numerous applications.

An important design consideration for the absolute distance measuring device 5 is the reflectivity of the intracavity facet 14 of the laser gain medium 10. In general, this reflectivity should be as low as possible, to maximize the contribution of light circulating within the external laser cavity relative to the light circulating only between the facets 12 and 14 of the laser diode gain medium 10. If the reflectivity of the intracavity facet 14 is greater than a certain critical value relative to the reflectivity of the target surface 40, the external cavity loses control of the oscillation wavelength and the device is inoperable. A detailed treatment of the stability criteria for the reflectivity of the intracavity facet 14 versus the target surface 40, can be found in "Bistability in Grating-Tuned External-Cavity Semiconductor Lasers," by Zorabedian et al., IEEE Journal of Quantum Electronics, vol. QE-23, No. 11, November 1987, which is incorporated herein by reference in its entirety.

If $r_0$ is the amplitude reflectance of the rear facet 12 of the laser cavity, and $r_{eff}$ is the effective reflectance of the front of the composite external cavity formed by the intracavity facet 14 and the target surface 40, then the oscillation condition for the external cavity laser is given by:

$$r_0 e^{(g-\alpha_m)l_D} e^{i\omega\tau} r_{eff} = 1 \qquad (7)$$

where g is the laser gain, $\alpha_m$ is the modal loss, $l_D$ is the laser diode length, $\omega$ is the laser frequency, $\tau=2nl_D/c$ is the laser diode round trip transit time, $r_0$ is the amplitude reflectance of the rear facet 12 of the laser diode, and $r_{eff}$ is the effective amplitude reflectance of the external cavity target surface 40 and the internal intracavity facet 14 of the laser diode. $r_{eff}$ can be defined as:

$$r_{eff} = \frac{r_i + \sqrt{\eta}\, r_e e^{i\omega\tau_e}}{1 + r_i \sqrt{\eta}\, r_e e^{i\omega\tau_e}} \qquad (8)$$

where $r_i$ and $r_e$ are the amplitude reflectances of the internal laser intracavity facet 14 and the external cavity target surface 40, respectively, $\eta$ is the intensity coupling coefficient of the external cavity back into the laser diode, and $\tau_e = 2L_{ext}/c$ is the round trip transit time of the external cavity. The threshold gain is found by setting the magnitude of the round trip gain in equation (7) equal to unity. In this situation, $$g = \alpha_m - \frac{1}{l_D} \ln(r_0 |r_{eff}|) \qquad (9)$$

If the maximum threshold gain with feedback is greater than the threshold gain with zero feedback the laser will no longer be controlled by the external cavity. Defining $\Delta g$ as the difference between the gain threshold with external feedback $g_{ext}$ and the gain threshold without external feedback $g_i$, $$\Delta g = g_{ext} - g_i = -\ln(|r_{eff}|/r_i) \qquad (10)$$

Assuming the modal loss is equivalent for the solitary laser diode and the external cavity laser diode, it can be seen from equation (10) that the external cavity loses control of the laser oscillation when the effective external cavity reflectance $r_{eff}$ is less than the reflectance $r_i$ of the internal intracavity facet 14 of the laser gain medium 10. Therefore, the condition for which the external cavity loses control of the laser oscillation is when $\Delta g > 0$.

The gain threshold difference between the gain threshold with external feedback $g_{ext}$ and the gain threshold without external feedback $g_i$, $\Delta g$, is also related to the semiconductor carrier density through the index of refraction. The carrier density changes as a function of the frequency, and therefore influences the gain change as a function of frequency, via the index of refraction. This relationship can be expressed as:

$$n = n_0 + \alpha(c/2\omega)\Delta g \qquad (11)$$

where $n_0$ is the refractive index for the solitary laser at threshold, and α is defined to be the ratio of real to imaginary changes in the refractive index. α is often referred to as the linewidth enhancement factor, because of the broadening effect on the laser linewidth due to the carrier density change.

The distance to the target surface 40 determines the center wavelength of the optical feedback spectrum coupled back into the laser waveguide. As discussed above, within the bandwidth of the optical feedback spectrum, many external cavity modes may be present. Oscillation will occur on the wavelength of the mode with the lowest gain threshold, which is near the peak of the optical feedback spectrum arising from the target reflection. This occurs because of mode competition. However, the value of $r_{\mathit{eff}}$ varies with the frequency ω of the reflected light according to equation (8), due to the interference of the external cavity with the residual reflectivity of the proximal laser facet. Therefore, the gain curve as described by equation (10) will show oscillatory behavior, going through a set of maxima and minima as a function of feedback frequency. This behavior is illustrated in FIG. 9, which shows important relationships related to the stability of the external cavity laser wavelength and thus to the operability of the measuring devices disclosed herein.

Figure 9:
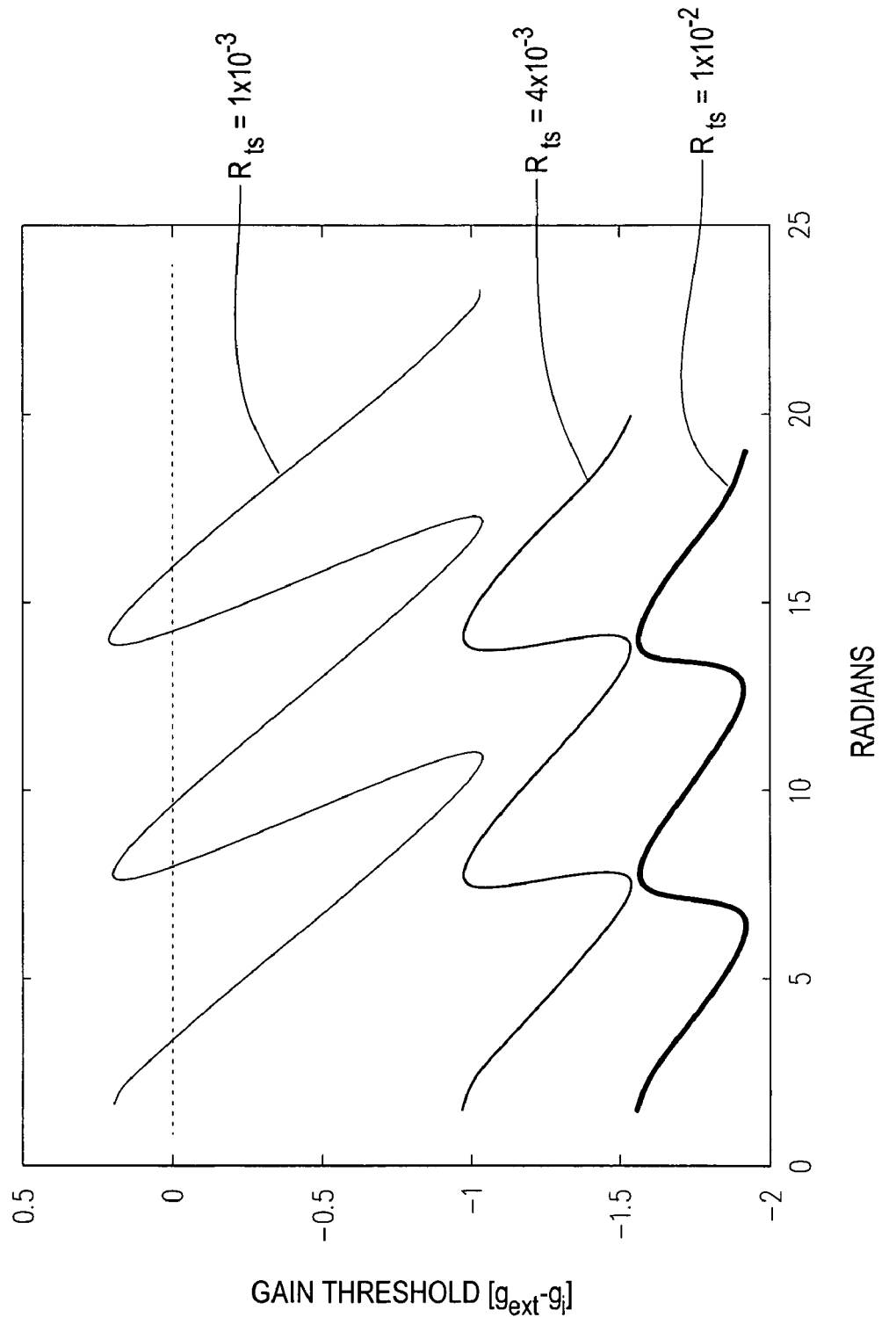
FIG. 9 illustrates an exemplary behavior of the gain threshold of the external cavity relative to that of the solitary laser diode versus wavelength, for different values of the external target reflectivity.

FIG. 9 shows the calculated behavior of the threshold gain as the wavelength changes, wherein the gain threshold is plotted vs. wavelength in terms of units corresponding to the solitary laser diode chip free spectral range. The units on the x-axis are in radians, so that the gain goes through one cycle every 6.28 units along the x-axis. The minima of the curves (that is, lowest threshold gain) represent wavelengths such that the phase of the wave formed by the external cavity (target surface 40) constructively interferes in the gain medium with the phase of the wave reflected by the proximal intracavity facet 14 of the laser gain medium 10. The three curves shown in FIG. 9 correspond to three different values of the effective reflectivity $R_{ts}$ of the target surface 40 used with the absolute distance measuring device 5. The value for the lowest curve is $1 \times 10^{-2}$, the value for the middle curve is $4 \times 10^{-3}$, and the value for the topmost curve is $1 \times 10^{-3}$. The reflectivity of the intracavity facet 14 of the gain medium 10 was, in each case, $1.5 \times 10^{-4}$.

For α=0, the gain is modulated sinusoidally as the feedback frequency is tuned through subsequent maxima and minima of the interference of the externally reflected wave with the internally reflected wave, as was previously described. This would lead to a symmetric, perfectly sinusoidal signal (not shown) corresponding to the change in gain threshold versus wavelength. However, for non-zero values of the linewidth enhancement factor, a different behavior is observed. For the three curves shown in FIG. 9, the linewidth enhancement factor a has a value of α=−5. For such non-zero α, the frequency of each solution is "pulled" non-uniformly with respect to its α=0 value by the gain-dependent semiconductor phase shift, caused by the changes to the index of refraction given by equation (11). The greatest pulling is between the frequencies of the resonant external feedback (threshold minima) and the longitudinal modes of the solitary laser diode, without external feedback. The smallest pulling is between the frequencies of the anti-resonant external feedback (threshold maxima) and the frequencies that are midway between the longitudinal modes of the solitary laser diode, without external feedback. This pulling effect leads to the skew in the gain threshold profiles shown in FIG. 9, away from a perfectly symmetrical, sinusoidal pattern.

As the value of the feedback amplitude is increased by increasing the reflectivity $R_{ts}$ of the target surface, the threshold gain is reduced according to equation (9) and the skew becomes less pronounced. For the lowest curve in FIG. 9, corresponding to a target reflectivity of $1 \times 10^{-2}$, the skew is relatively small, only approaching the point of creating a vertical line between the threshold maximum and the threshold minimum. At this value of target reflectivity, the laser will display stable, single mode operation. In the next curve, corresponding to $R_{ts}=4 \times 10^{-3}$, the skew is past vertical so that two or more gain threshold values may exist for a given frequency. Therefore, for sufficiently large variations in gain due to the interference of waves reflected from the intracavity facet 14 with waves reflected from the target surface 40, the gain profile becomes re-entrant, creating frequency zones with multiple thresholds. In the topmost curve, corresponding to the lowest target reflectivity of $1 \times 10^{-3}$, the gain profile goes above zero, so that at this low value of the target reflectivity, the external cavity loses control of the oscillation.

As can be seen in FIG. 9, for which a linewidth enhancement factor of α=−5 and an intracavity facet 14 reflectivity $R_i$ of $1.5 \times 10^{-4}$ are the assumed underlying parameters, the gain profile becomes re-entrant for values of reflectivity $R_{ts}$ of the target surface 40 of less than approximately $1 \times 10^{-2}$. Thus, in order for the laser diode absolute distance measuring device 5 to operate in a monostable regime, $1 \times 10^{-2}$ is the critical value of the reflectivity $R_{ts}$ of the target surface for this assumed set of parameters. The value for the target reflectivity for which the gain profile becomes re-entrant, depends on the intracavity facet reflectivity. For a given set of design parameters, the critical value of the target reflectivity generally scales with the value of the intracavity facet reflectivity. Thus, one way of allowing lower target reflectivity, while still maintaining stable operation of the laser diode absolute distance measuring device 5, is to decrease the intracavity facet reflectivity.

Figure 10:
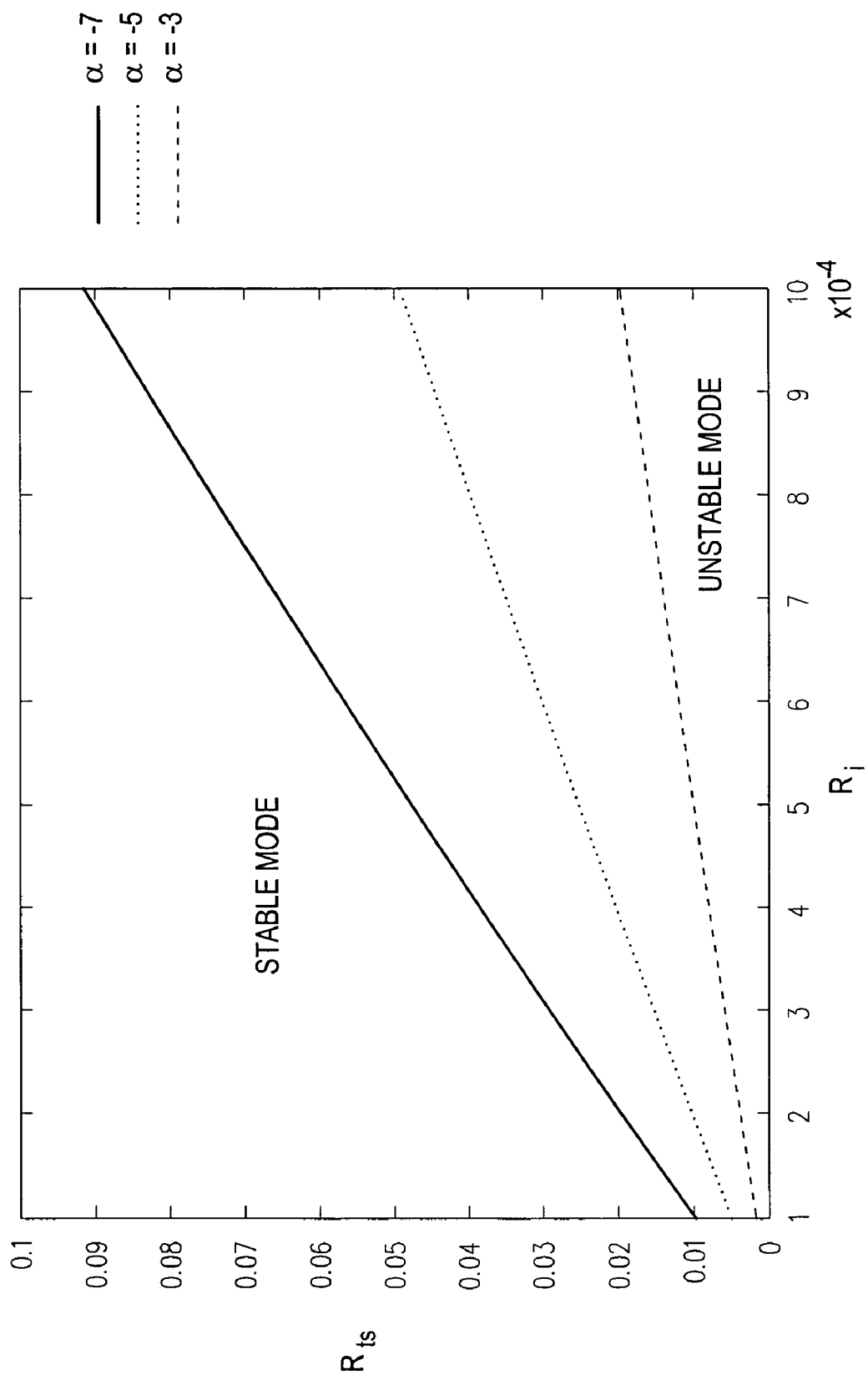
FIG. 10 illustrates an exemplary range of reflectivities required of the target surface, compared to the reflectivity of the intracavity facet of the laser gain medium, in achieving stable, single mode operation of the absolute distance measuring device.

FIG. 10 is a plot of these critical values for the reflectivity $R_i$ of the intracavity facet 14 compared to the reflectivity $R_{ts}$ of the target surface 40. According to equation (10), the gain threshold will depend on the ratio of the effective reflectivity of the external cavity including the target surface 40, compared to the reflectivity of the intracavity facet 14 of the laser gain medium 10. FIG. 10 shows the values for which the absolute distance measuring device will operate with stable, single mode output. The three lines in the figure correspond to different values of the line enhancement factor α. The lines separate regions of stable behavior, from regions with unstable behavior such as the re-entrant behavior illustrated in FIG. 9, based on the ratio of the reflectivity of the target surface $R_{ts}$ compared to the reflectivity of the intracavity facet 14 of the laser gain medium 10, $R_i$. As can be seen in the figure, the largest region of stable behavior corresponds to the smallest absolute value of the line enhancement factor α.

The treatment set forth above for the case of finite linewidth enhancement factors α, sets some bounds on the acceptable values for the reflectivities of the target surface 40, relative to the reflectivity of the intracavity facet 14. For example, according to FIG. 10, if the intracavity facet 14 of the laser gain medium 10 has a reflectivity of $5 \times 10^{-4}$, the target surface must have a reflectivity in excess of about 5% in the case of a linewidth enhancement factor of −7, in order for the absolute distance measuring device to operate in a stable regime. For a linewidth enhancement factor of −5, the target reflectivity may be as low as 2.5% and the absolute distance measuring device 5 will still operate in a stable mode. For a linewidth factor of only −3, the target reflectivity may be as low as 1% and the absolute distance measuring device will still operate in a stable mode. The value of the linewidth enhancement factor α depends strongly on the laser diode structure and also is also influenced by laser injection currents and operation near the edge of the laser gain bandwidth. As a practical matter, laser diodes that provide an operable linewidth enhancement factor α are available or can be fabricated, and the primary factor that is most readily specifiable and/or alterable or controllable to insure the operational stability of the measuring device 5 is the reflectivity of the intracavity facet 14.

Intracavity facet reflectivity as low as $5 \times 10^{-4}$ and lower are provided in commercially available devices from Sacher Lasertechnik, LLC, 5765 Equador Way, Buena Park, Calif. 90620, U.S.A and Sacher Lasertechnik GmbH, Hannah Arendt Straβe 3-7, D-35037 Marburg, Germany. A method for fabricating intracavity facets with such reflectivity is disclosed in U.S. Pat. No. 6,297,066 to Sacher, which is incorporated herein by reference in its entirety. Furthermore, "Broadband multilayer antireflection coating for semiconductor laser facets," by Braun et al. (Optics Letters, vol. 20, no. 10, May 15, 1995), incorporated herein by reference in its entirety, describes a triple layer antireflection coating of $Al_2O_3$, Si and $SiO_2$, which can render a laser diode facet having reflectivity of only $1 \times 10^{-6}$ over a bandwidth of 90 nm for a laser operating at 1550 nm. For the 1310 nm emitting InGaAsP lasers, a facet reflectivity of $3 \times 10^{-6}$ and a bandwidth of 30 nm was achieved. The indices of refraction for the three materials were 1.57, 3.54 and 1.44, respectively. The film thicknesses for the three layers were $0.278\lambda$, $0.099\lambda$, and $0.054\lambda$, respectively. The multilayer coating was applied to 1550 nm InGaAsP diode lasers. Such antireflective coatings may provide suitable performance for the construction of an absolute distance measuring device 5.

In general, according to the data shown in FIGS. 9 and 10, an effective target surface 40 reflectivity in the range of 10× to 100× greater than the reflectivity of the intracavity facet 14 is adequate to allow stable operation of the laser diode absolute measuring device. The native reflectivity of many unfinished rolled sheet metals is in the range of 0.3-0.8, that is, 300× greater than an intracavity facet 14 reflectivity in the range of $1 \times 10^{-3}$. To achieve a ratio of approximately 100× between the effective target surface 40 reflectivity and the reflectivity of the intracavity facet 14, an intracavity facet 14 reflectivity of approximately $3 \times 10^{-3}$ or less is desirable. An intracavity facet 14 reflectivity of approximately $1 \times 10^{-3}$ or less is desirable if reliable operation with a relatively wider variety of target surfaces is desired, and an intracavity facet 14 reflectivity of approximately $5 \times 10^{-4}$ or lower is desirable if even more reliable operation with an even greater variety of target surfaces is desired. The reflectivity of finished and/or polished surfaces is even higher. Thus, even allowing for various other optical power losses in the external cavity, a measuring device 5, 6, 7, or 8 can be provided that provides stable operation with a wide variety of target surfaces.

While this invention has been described in conjunction with the exemplary embodiments outlined above, it is evident that many alternatives, modifications and variations will be apparent to those skilled in the art. Accordingly, the exemplary embodiments of the invention as set forth above are intended to be illustrative not limiting. Various changes may be made without departing from the spirit and scope of the invention.

What is claimed is:

1. A distance measurement apparatus comprising:
   a focusing element that focuses light in a focal plane whose respective distance from the focusing element depends on a respective wavelength of the light, such that the respective wavelength of light is reflected from a focal spot on a target surface back toward the focusing element when the target surface is located at the respective distance;
   a light-amplifying gain medium having an intracavity facet and a rear facet, the light-amplifying gain medium providing light to and receiving light from the focusing element; and
   a wavelength sensing device:
   wherein:
   when the distance measuring apparatus is operably arranged relative to the target surface a resonant cavity is formed between the rear facet and the target surface;
   the light-amplifying gain medium predominantly receives the respective wavelength of light reflected from the focal spot on the target surface and preferentially amplifies and emits the received predominant respective wavelength of light; and
   the wavelength sensing device is arranged to sense the respective wavelength of light amplified by the light-amplifying gain medium and to provide a signal corresponding to that respective wavelength, wherein the respective wavelength corresponds to the respective distance such that the signal is indicative of the respective distance.

2. The apparatus of claim 1, further comprising a beamsplitter positioned in the resonant cavity to direct a portion of light circulating in the resonant cavity into the wavelength sensing device.

3. The apparatus of claim 1, wherein the wavelength sensing device is disposed behind the rear facet of the gain medium.

4. The apparatus of claim 1, further comprising a collimating lens and an imaging lens disposed to receive light having the wavelength to be sensed and to concentrate that light at an input of the wavelength sensing device.

5. The apparatus of claim 1, wherein the wavelength sensing device is one of a spectrometer, a wavemeter and a wavelength-sensitive photodiode.

6. The apparatus of claim 1, wherein the wavelength sensing device comprises a semiconductor optical amplifier arranged such that its transparency current is dependent on the laser emission wavelength.

7. The apparatus of claim 1, further comprising:
   an etalon disposed in the resonant cavity.

8. The apparatus of claim 7, wherein the etalon is disposed at a non-perpendicular angle to an optical axis defined by the resonant cavity.

9. The apparatus of claim 1, wherein the intracavity facet of the gain medium is coated with an anti-reflective coating having a reflectivity less than about $3 \times 10^{-3}$.

10. The apparatus of claim 1, wherein the intracavity facet of the gain medium is coated with an anti-reflective coating having a reflectivity less than about $1 \times 10^{-3}$.

11. The apparatus of claim 1, wherein the intracavity facet of the gain medium is coated with an anti-reflective coating having a reflectivity less than about $5 \times 10^{-4}$.

12. The apparatus of claim 1, wherein a reflectivity of the intracavity facet of the laser gain medium is at least about 10× lower than a reflectivity of the target surface.

13. The apparatus of claim 1, further comprising:
an optical element disposed between the gain medium and the focusing element, which corrects for a non-circular beam shape of light amplified and emitted by the gain medium toward the focusing element.

14. The apparatus of claim 1, further comprising:
a collimating lens disposed between the gain medium and the focusing element.

15. The apparatus of claim 1, wherein the focusing element is a diffractive optical element.

16. The apparatus of claim 15, wherein the diffractive optical element is a zone plate.

17. The apparatus of claim 1, wherein the gain medium has a linewidth enhancement factor of greater than about −7.

18. A distance measurement apparatus comprising:
means for focusing light in a focal plane whose position depends on and corresponds to a wavelength of the light, such that a respective wavelength of light is reflected from a focal spot on a target surface when the target surface is located in the corresponding respective focal plane;
means for amplifying the respective wavelength of light reflected from the focal spot on the target surface;
means for measuring a wavelength of the amplified light;
means for collimating the amplified light;
means for correcting a non-circular beam shape of the amplified light; and
means for selecting a single longitudinal mode of the amplified light.

19. A distance measuring method comprising:
using a chromatically dispersive focusing element to output and focus light having one or more wavelengths in at least one focal plane, the position of each focal plane corresponding to one of the wavelengths of the light;
reflecting a respective wavelength of the light from a focal spot on a target surface back through the focusing element when the target surface is located in a respective focal plane corresponding to that respective wavelength of light;
receiving the light reflected back through the focusing element with a laser gain medium and receiving that light only within a cone of admittance of the laser gain medium;
amplifying the received light in the laser gain medium to provide amplified light;
extracting a portion of the amplified light from the laser gain medium; and
measuring a wavelength of the extracted portion of the amplified light.

20. The method of claim 19, further comprising:
disposing an etalon between the focusing element and the gain medium and receiving light reflected back through the focusing element and the etalon with the laser gain medium.

21. The method of claim 19, wherein the step of using a chromatically dispersive focusing element comprises:
positioning a diffractive optical element between the target surface and the gain medium.

22. The method of claim 19, further comprising:
using an intracavity facet of the gain medium having an anti-reflective coating with a reflectivity of $3\times10^{-3}$ or less.

23. The method of claim 19, further comprising:
using a rear facet of the gain medium with a partially transmitting reflective coating.

* * * * *